July 3, 1956

C. W. JACOB 2,752,833

APPARATUS FOR REPRODUCTION OF PICTURES

Filed Nov. 2, 1950

INVENTOR.
CARLYLE W. JACOB

BY

ATTORNEY

July 3, 1956 C. W. JACOB 2,752,833
APPARATUS FOR REPRODUCTION OF PICTURES
Filed Nov. 2, 1950 3 Sheets-Sheet 2

INVENTOR.
CARLYLE W. JACOB
BY
ATTORNEY

July 3, 1956   C. W. JACOB   2,752,833
APPARATUS FOR REPRODUCTION OF PICTURES
Filed Nov. 2, 1950   3 Sheets-Sheet 3
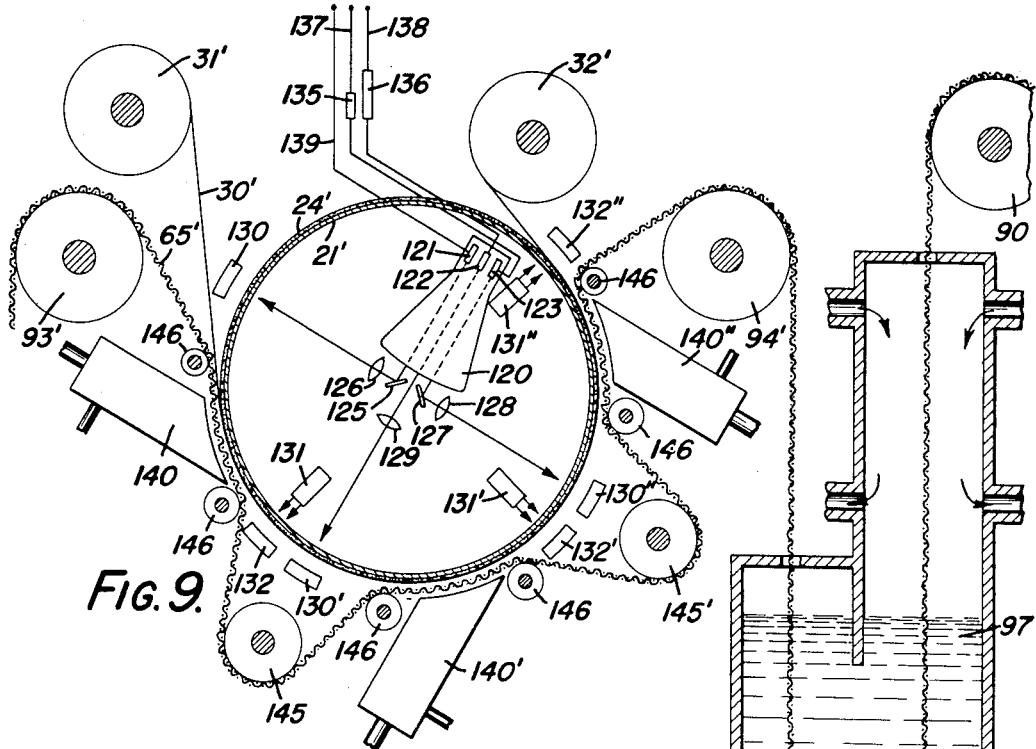
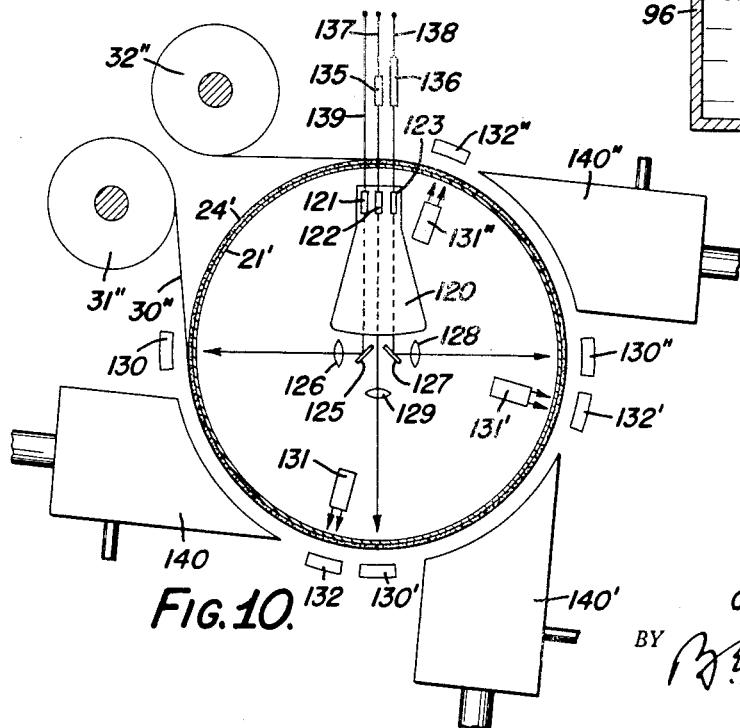
INVENTOR.
CARLYLE W. JACOB
ATTORNEY United States Patent Office 2,752,833
Patented July 3, 1956

2,752,833

APPARATUS FOR REPRODUCTION OF PICTURES

Carlyle W. Jacob, Rochester, N. Y.

Application November 2, 1950, Serial No. 193,588

15 Claims. (Cl. 95—1.7)

The present invention relates to apparatus for recording electrical signals, more especially for reproducing pictures, photographs, paintings, transparencies, films and other pictorial representations. In a more specific aspect, the invention relates to apparatus for reproducing pictures and pictorial representations according to the process disclosed in my co-pending U. S. patent application Serial No. 173,987, filed July 15, 1950.

In the process of my above-mentioned application, an electrical conducting plate, that is coated with a photo-sensitive material, is used. In one embodiment of the invention a sheet of recording paper is placed over the photo-sensitive material. Then an image of the picture, which is to be reproduced, or more broadly, an image of the electrical signal, which is to be recorded, is projected onto the photo-sensitive material so as to produce an electrostatic image on said photo-sensitive material corresponding to the original. Then a stream of electrically-charged pigment particles, such as ink droplets, is directed at the paper so that the droplets are carried into the electrical field of the photo-sensitive coating. The droplets over certain areas of the coating will be drawn to and deposited on the paper, and the droplets over other areas of the coating will be repelled, as determined by the image carried by the photo-sensitive coating. Thus, an inked reproduction of the original will be made on the paper.

To secure better definition, a screen or grid, may be placed directly over the paper and close thereto. The charged droplets then have to pass through this screen or grid to reach the paper. The screen will electrically isolate the various areas of the photo-sensitive surface from one another. Thus, the charged particles will be completely uninfluenced by the charge on the photo-sensitive surface until the droplets pass through the screen. Then they are influenced only by the charge on that part of the photo-sensitive surface which is directly under the particles. In some cases, the plate may be made transparent and the image of the picture, which is to be reproduced, may be projected onto the photo-sensitive material through the transparent plate.

A primary object of the present invention is to provide apparatus for recording electrical signals according to the process above described which will be very fast.

Another object of the invention is to provide apparatus for recording electrical signals according to the said process which will permit the process to be carried on in a continuous operation.

A further object of the invention is to provide apparatus for effecting the described process by means of which the paper, on which the electrical signals are to be recorded, can be held taut and in close contact with photosensitive surface thereby to assure best results in recording.

Another object of the invention is to provide apparatus for reproducing pictures according to the process above described in which the screen or grid may be cleaned continuously so as to keep it continuously most efficient.

A further object of the invention is to provide apparatus for reproducing pictures according to the process above described in which the screen may be shifted continuously relative to the paper to prevent any blind spots in the reproduction.

A further object of the invention is to provide apparatus for reproducing pictures according to the process above described which will permit continuous reproduction of color pictures in color.

Another object of the invention is to provide apparatus of the character described for the purpose described which will permit of maintaining a screen taut during the reproduction operation.

Other objects of the invention will be apparent hereinafter from the specification and from the recital of the appended claims.

In the drawings:

Fig. 9 is a view similar to Fig. 1 illustrating a further embodiment of the invention adapted for the reproduction of color pictures in color; and Fig. 10 is a similar view illustrating a still further modification of the invention for color picture reproduction.

Figure 1:
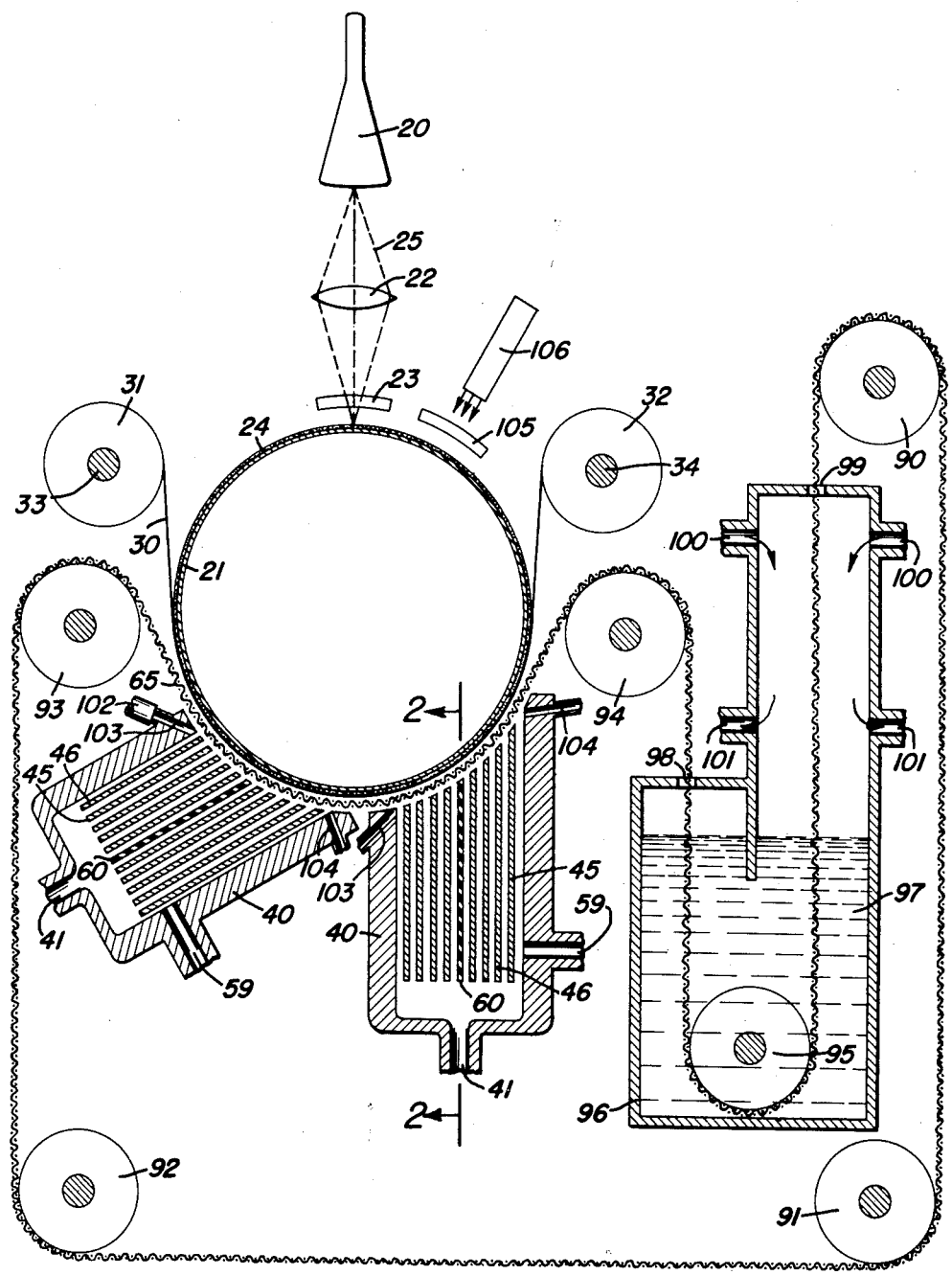
Fig. 1 is a sectional view, more or less diagrammatic, illustrating the structure and operation of apparatus built according to one embodiment of this invention.
Figure 2:
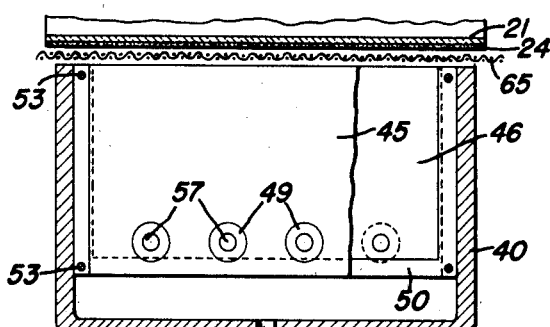
Fig. 2 is a section on the line 2—2 of Fig. 1 looking in the direction of the arrows and showing particularly the construction of one of the chambers from which the electrically-charged droplets are directed at the recording paper.

Referring now to the drawings by numerals of reference, and first to the embodiment of the invention illustrated in Figs. 1 to 6 inclusive, 20 denotes a cathode ray tube, and 21 designates a rotary drum which may be made of metal or other electrically-conducting material and which is coated with a layer 24 of light-sensitive, photo-conducting material such as anthracene, sulphur, or the like. Photosensitive materials like caesium may also be used as explained in my copending application Serial No. 173,987 already mentioned. The drum is adapted to be rotated by means which will be described further hereinafter.

The cathode ray tube 20 is actuated and controlled by scanning the original of the picture, which is to be reproduced, by any conventional means. One such means is illustrated in my pending U. S. patent application Serial No. 17,773, filed March 29, 1948, now Patent No. 2,573,143, granted October 30, 1951. The invention is illustrated in Fig. 1 in connection with a set-up in which the cathode ray tube forms a line image representing the pattern of information obtained by scanning the original of the picture. The cathode ray tube may, however, also be used to form a two dimensional image, as in a television receiver, and as will be described further hereinafter.

A conventional lens 22 and a transparent electrode 23 are interposed between the cathode ray tube 20 and the drum 21. The image appearing on the cathode ray tube is focused by the lens 22 on the light-sensitive coating 24 on the surface of the drum 21, the light rays 25, which are emitted by the tube and which pass through the lens 22, passing also through the transparent electrode 23 onto the light sensitive coating 24.

The transparent electrode 23, which may be made of a suitable conducting plastic, is maintained at a strong potential relative to the drum 21; and the drum may be grounded for convenience. Those points on the light sensitive coating 24, which are illuminated by the light-rays 25, are rendered conductive. At these points, the electric charge is drawn outward to the surface of the light sensitive coating 24 under the influence of the strong electric field between the transparent electrode 23 and the drum 21. This electric charge then remains at the surface of the light sensitive coating as the drum rotates outside the illuminated area.

The paper, fabric, or other material, upon which the image is to be reproduced, is denoted at 30. This material 30 is preferably non-conducting. It is wound part way around the drum to be fed from supply roll 31 onto take-up roll 32. These rolls are removably mounted upon rotary spools or spindles 33 and 34, respectively, which may be driven in any suitable manner. The paper is held smooth and taut because it wraps around a good portion of the periphery of the drum and is wound up on one roll 32 as fast as it is wound off the other roll 31. Normally paper would tend to leave a photosensitive surface, such as surface 24, because of the electrostatic forces resulting from the electric charge deposited on the paper by the droplets. By wrapping the paper around a curved surface, however, the paper is maintained taut. This makes for an improved reproduction and is an important feature of the invention.

Mounted at a suitable point or points around the drum 21 in close proximity thereto and to the paper 30 are one or more chambers 40. These chambers supply the marking particles for recording on the paper or other recording material 30 the image which is to be reproduced. A suspension of electrically-charged marking particles in air or other gas is supplied to each chamber 40 through a duct 41.

The marking particles usable include not only conventional black and colored inks but also other media such as dyes and transparent gelatin or plastics. By using gelatin particles high quality matrixes can be made for use in the dye-transfer printing process. The marking particles can be charged by the methods outlined in my copending application, Serial No. 2,624, filed January 26, 1948, now Patent No. 2,577,894, or in my Patent No. 2,573,143, already mentioned. The droplet chambers 40 may be similar in construction to those disclosed in my application Serial No. 173,987 above mentioned, and their construction is illustrated only diagrammatically in Fig. 1. Their construction is shown in more detail in Figs. 2 and 3.

Mounted within each chamber 40 are a plurality of generally rectangular, parallel plates 45 and a plurality of generally rectangular, parallel plates 46. The plates 45 alternate with the plates 46. The right hand sides 47 and 48, respectively, of the plates 45 and 46, respectively, are plane surfaces. Each plate 45 is formed on its left hand face with a plurality of circular bosses 49 which act as spacers between the left hand side of each plate 45 and the right hand side of the next adjacent plate 46. Each plate 46 has a U-shaped flange 50 extending around the bottom and the two side edges of the plate and adapted to contact with the adjacent right hand plane side 47 of the next adjacent plate 45 so as to provide a space 52 between two adjacent plates 45 and 46, which space is bounded at the bottom and on two sides by the flange 50. The several plates 45 and 46 are secured together at their four corners by rods or bolts 53. These rods or bolts pass through the walls of the chamber and are secured thereto by nuts 54.

The bosses 49 of each plate 45 are drilled to provide holes 57 which extend through the plate. The holes 57 of the several bosses 49 of the several plates 45 are in alignment with each other. These several holes are also aligned with holes 58 which extend through the thin portions of the several plates 46. In the illustrated embodiment of the invention, there are four bosses 49 (Fig. 2) on each plate 45, therefore four holes 57 in each plate 45, and with each hole 57 there is aligned a hole 58 in each plate 46. Therefore, there are four ducts, composed of axially-aligned holes 57 and 58, extending through the plates 45 and 46 from one side of each chamber 40 to the other. These holes communicate with ports 59 provided in the right hand wall of each chamber in alignment with the several ducts in the plates. Air may discharge from each chamber through these ports.

The electrically-charged pigment particles, which are introduced into each chamber 40 through duct 41, pass around the bosses 49 of the plates 45 into the spaces 52 between plates 45 and 46 and are directed by the plates toward the drum 21.

For high quality reproduction, it is preferable to pass a perforated screen or grid between the discharge end of each chamber 40 and the recording paper 30 and very close to paper 30. This screen, as previously mentioned, electrically isolates the various areas of the photoconductive surface 24 from one another. Thus, the charged particles from the droplet chambers 40 will be completely uninfluenced by the charge on the photoconductive surface 24 until the droplets pass through the screen. Then they are influenced only by the charge on that part of the photoconductive surface 24 which is directly under the particles. The screen, which is denoted at 65, is preferably maintained at a small potential difference with respect to the drum.

Figure 3:
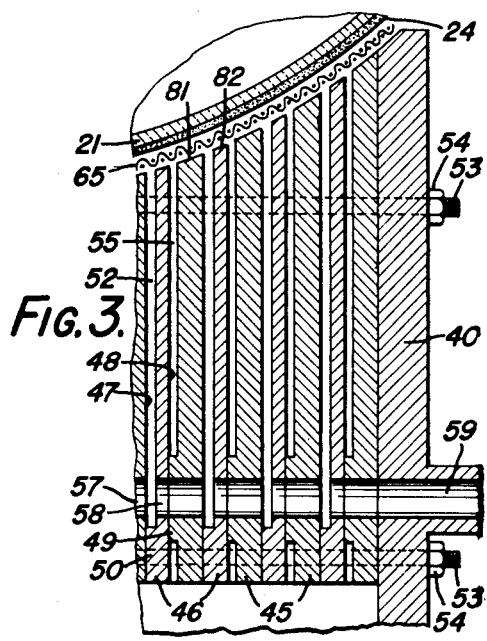
Fig. 3 is a fragmentary view on an enlarged scale further showing the structure of the droplet chamber, the screen, and the coated drum.
Figure 4:
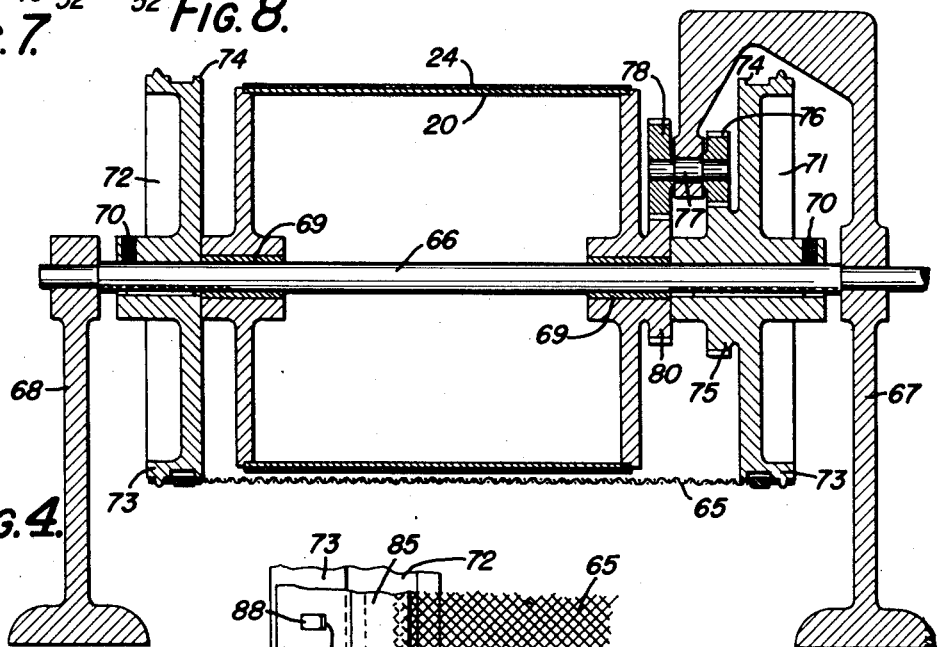
Fig. 4 is an axial section through the drum and showing the driving mechanism for the drum and screen.

In the embodiment shown in Figs. 1 to 6 inclusive, the screen is an endless screen. It is adapted to be driven in time with the rotation of the drum; and the drive to the screen and the drum may be as illustrated in Fig. 4.

This drum comprises a shaft 66 which is journaled at opposite ends in bearing members 67 and 68. The drum 20 is rotatably mounted upon this shaft being journaled thereon by means of bushings 69. Keyed to the shaft and fastened thereto by a set screw 70 are two axially-spaced, rotary drive members 71 and 72. Each of these drive members has a sprocket wheel 73 integral with it. Each of these drive members also has a peripheral flange 74 integral with it, and spaced axially from the sprocket 73. The drive member 71 also has a spur gear 75 integral with it. This gear meshes with a spur pinion 76 which is keyed or otherwise fastened to a stud 77 that is journaled in the supporting member 67. There is a spur pinion 78 keyed or otherwise fastened to the opposite end of the stud 77. This pinion meshes with a spur gear 80 which is integral with the drum 20. The gear reduction 75, 76, 78, 80 causes the drum to revolve at a different rate from the drive members 71, 72 so that the screen moves at a slightly different rate from photoconductive surface 24. This obviates any possible "shadow effect" of the screen.

Figure 5:
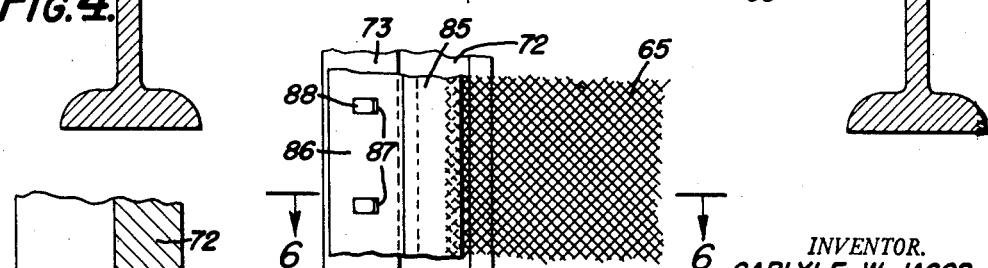
Fig. 5 is a fragmentary view showing in elevation the screen or grid and how it is driven.
Figure 6:
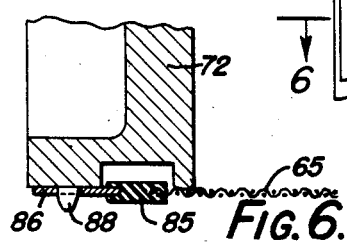
Fig. 6 is a section on the line 6—6 of Fig. 5.

The screen 60 is preferably made as shown in Figs. 5 and 6 with its wires extending diagonally of the drum. Rubber strips 85 are secured to opposite sides of the screen and these are secured to metal strips 86 which are provided with uniformly spaced holes 87 to receive and engage the teeth 88 of the sprocket wheels 73. The rubber strips maintain the screen taut laterally and since the screen weave is roughly at an angle of 45°, transverse tautness is also insured. The strips 86 can also be made of rubber with sprocket holes 87 reinforced by metal inserts.

It it important that, as shown in Fig. 3, edges 81 and 82 of the plates 45 and 46 be shaped on an arc parallel to the surface of the drum to closely follow the contour of the drum so that the electrical field between the ducts in the droplet chambers and the screen will be approximately normal to the screen. The ducts 52 are also preferably placed, as shown, at an angle so that the particles will not have to change their direction of flow too abruptly in passing over the edges 81 and 82 of the ducts. If the ducts are normal to the screen their edges should be at least shaped, as shown, to steer the suspension in the proper direction.

Since, to obtain a high quality tonal reproduction it is desirable that the electrical field influencing the deposition of the particles on the paper vary during deposition, different ducts 52 of a chamber 40 are preferably put at different potentials. For this purpose, an insulating plate 60 (Fig. 1) may be mounted in each droplet chamber to divide the chamber into two halves so that, for instance, the ducts on one side of the insulating plate 60 are at one potential and the ducts on the other side of this plate are at a different potential. Furthermore, the charges and sizes of the particles fed into the two droplet chambers 40 can be different for the above reasons. The insulating plates 60 are provided with holes (not shown) communicating with holes 57 and 58 (Fig. 3) of plates 45 and 46 to form with said holes 57 and 58 uninterrupted air-discharge ducts. The two droplet chambers 40 are preferably provided, as shown, to make successive deposits on the recording paper and thereby improve the tonal qualities of the reproduction.

The screen is electrically-conducting and functions as a potential surface. Being very close to the photo-conductive surface 24, it will electrically isolate the various areas of the photo-conductive surface from one another. Thus, the charged particles emitting from chambers 40 are completely uninfluenced by the charge on the photo-conductive surface 24 until they pass through the screen. Then they are influenced by the charge on that part of the photo-conductive surface which is directly under the particles.

The speed of the particle-type gas suspension entering the ducts or spaces 52 between the plates 45 and 46 of the chambers 40 should be such that the lateral motion of the particles over the edges 81 (Fig. 3) of the plates 45 should be at least approximately equal to the linear motion of the drum. The sides of the plates 45 and 46 bounding the spaces 52 are put at such a potential with reference to the screen 65 and the drum 20 that the particles will preferably be driven electrically to the screen and drum.

For good definition it is preferable that the marking particles be travelling, when they reach the vicinity of the screen and drum, with as close as possible to the same lateral velocity as the screen and drum. For this purpose, a blanket of clean air is preferably provided between the mouths of the chambers 40 and the screen that flows adjacent to the screen and travels at as closely as possible the some linear speed as the screen and drum. The charged pigment particles propelled toward the screen from the ducts 52 of chambers 40 must pass through this blanket of moving air. In doing so they tend to take on the same lateral velocity as the air blanket and thus reach the screen with substantially the same lateral velocity as the screen. Thus the pigment particles have substantially no lateral motion with respect to the screen and drum. This materially aids achievement of good definition in reproduction.

The moving air blanket may be obtained by coupling an air line 102 with a duct 103 which is provided on the leading side of each chamber 40 and which is positioned to direct the air from line 102 into the space between the mouth of the chamber and the screen. An air outlet duct 104 may be provided in the leaving side of each chamber 40 to permit ready escape of the air from between the screen and the mouth of the chamber, thereby permitting ready movement of the air blanket. If desired each duct 104 can be connected to the suction side of an air-pressure pump. The flow of air in line 102 will be controlled to secure the proper rate of linear movement of the air blanket.

Although the screen is desirable for very high quality reproduction it is not absolutely necessary. Reproductions can be made without screens. When the droplet chambers 40 alone are used they should be placed somewhat closer to the drum 21 than when the screen 65 intervenes between the droplet chambers and the drum. The air blanket supplied through ducts 102 is especially valuable when a screen is used but may also be of advantage when no screen is employed.

The particles which pass through the screen 65 and are repelled from the photo-conductive surface 24, are deposited on the screen. To keep the screen clean, it may be made endless, and pass through a washing bath. Such an arrangement is shown in Fig. 1. Here the screen is mounted to pass over rollers 90, 91, 92, 93 and 94, and under a roller 95. The latter is journaled in a chamber 96 which contains a solvent 97 for the ink. This chamber is provided with openings 98 and 99 through which the screen passes into and out of the chamber. It is also provided with ducts 100 and 101, above the level of the solvent 97, through which heated air may be admitted into and pass out of the chamber, respectively, to dry the screen after it has passed through the cleaning bath 97.

To discharge the light sensitive coating 24 so that each time that an area of the drum passes the cathode ray tube 20 it may receive a different photo-conductive image, a transparent grounded electrode 105 and a light source 106 are provided. The light shining through the transparent grounded electrode 105 will evenly illuminate the area of the photo-conductive surface under it and the electrode will act to make the area of the surface passing under the electrode of a uniform potential.

To insure that the paper 30 contains no residual charge before contacting the drum, a radio active plate (not shown) may be used.

To obtain reproductions with sharp definition the screen and drum should travel at nearly the same speed within very close limits, but these two speeds should preferably not be exactly the same. The screen should travel preferably at a slightly greater or a slightly less speed than the paper so that if any defects are present in the screen the effect will be averaged out over a large image area. The drive shown in Fig. 4 provides for this. At intervals, the particle flow through the ducts 52 can be stopped, also, and the screen moved several feet at a rapid speed, if desired, so as to expose a fresh portion of the screen.

In the operation of the apparatus shown in Figs. 1 to 6 inclusive, the line image formed in the cathode ray tube 20 by scanning the original is projected onto the photo sensitive surface 24 of the drum 21 and there forms an electrostatic image of the original. As the drum revolves, this image is carried under the recording paper 30, and when the image arrives abreast of a droplet chamber 40, the ink particles directed at the drum from the chamber 40 and passed through the screen 65 are either deposited on the paper 30 through electrical attraction or repelled, depending upon the charge of the different areas of the photo-conductive surface under the paper. Thus a reproduction of the image produced by cathode ray tube 20 is made on the paper 30. By providing two droplet chambers, better tonal reproduction can be obtained. The images are wiped off of each area of the photo-conductive area 24, after that area has revolved clear of the paper and as that area passes under electrode 105, by light from the source 106 projecting through the grounded transparent electrode 105 onto the photoconductive surface. Hence, the operation of reproducing images, that are produced in the cathode ray tube 20 may be continuous, as may also be the printing of these reproductions on the paper 30. The screen 65 is, moreover, continuously cleaned to remove from it the ink particles which may be deposited thereon.

The drum should preferably be kept cool, as compared with the screen 65 and chambers 40, during use. This may be done by mounting cooling pipes within it and circulating ammonia, brine or any other suitable refrigerant through them. Where copious quantities of an electrically-charged fluid, even a non-conducting fluid, are present the free charge tends to migrate in the fluid in the direction of the electric fields. This is true in the case of ink droplets deposited on the paper 30. However, if the drum is subcooled the viscosity of the fluid of the deposited droplets is increased and the electric charge cannot migrate. One of the advantages of making the deposition directly on paper, however, is that the paper tends to soak up the liquid and prevent migration.

The line image focused on the drum need not necessarily be produced by a cathode ray tube. It can be the image of a slide or strip of film projected through a slit system. Furthermore, it should be understood that the invention is not limited to reproduction of line images. Complete two dimensional images, like a television image on the cathode ray of a television projector, or like the image produced by the projection of a complete picture or slide can also be used. When this is done, the drum should be stopped for the instant when the exposure is made. Then the drum should be allowed to rotate until another picture is ready to be exposed.

Any suitable intermittent driving mechanism, such as a Geneva mechanism, may be used to drive the drum intermittently.

When the drum is driven intermittently, deposition of the pigment particles can be made to take place only at those moments when the drum is stopped and when a previously-exposed area of the photo-conductive surface 24 is under a chamber 40. In this case, the screen 65 must also be stopped whenever the drum 21 is stopped.

When no screen is used and the drum is stopped intermittently for pigment-particle deposit on the recording paper, the droplet suspension is preferably introduced into the ducts 52 in puffs, say 0.01 second in motion and 0.1 second at rest. In this way deposition will take place essentially when the particles have no lateral motion.

To insure that during the 0.01 second when the droplets do have lateral motion there will be no deposition, a mild potential should be applied either to the metal drum 21 or to the ducts 52 to produce an additional electrical field between drum and ducts that will tend to pull the droplets, which are suspended in the air stream, away from the vicinity of the paper 30. This potential may be applied for the entire 0.01 second or only during a fraction thereof. Obviously this potential should not be so strong as to drive all particles out of the space between the paper 30 and the chambers 40, but only strong enough to prevent unwanted deposition.

Figures 7, 8:
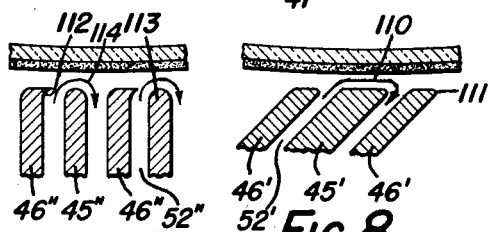
Fig. 7 is a fragmentary view illustrating somewhat diagrammatically a different structure of droplet chamber and how it operates.
Fig. 8 is a similar view illustrating a still further modification of droplet chamber and its operation.

As already indicated in Figs. 1 and 3, the chambers 40 are preferably so disposed that the droplets will not have to change their direction of flow too abruptly in passing over the ends 81 of the plates 45 into the air stream and into the electrical field of photo-conductive surface 24. To further improve smooth flow of the pigment particles from the ducts 52, the plates may be positioned as shown in Fig. 8. Here the different plates of a droplet chamber 40 are denoted at 45' and 46', respectively. These plates are disposed at an angle. The arrow 110 denotes the direction of flow of particles out of the ducts 52' and the direction of return flow of the air. To avoid any eddy currents, the leaving edges 111 of the plates 45' and 46' are preferably rounded, as shown.

The plates may be disposed, however, to be generally normal to the drum. If the plates are normal to the drum, however, the edges of the plates 46'' should preferably be shaped with arcuate protrusions 112 and the edges 113 of the plates 45'' should be rounded in order to steer the suspension in the proper direction, as denoted by arrow 114 in Fig. 7.

For three color work, a cathode ray tube 120 (Fig. 9) may be used that contains three electron guns 121, 122 and 123. In this case the drum 21' is made of transparent conductive plastic and is grounded; and the cathode ray tube is mounted within the drum.

The image patterns formed on the face of the cathode ray tube 120 by the electron guns 121 and 123 are projected by mirrors 125 and 127, respectively, through lenses 126 and 128, respectively, onto two diametrically opposite areas of the drum, while the line pattern formed on the face of the tube 120 by the electron gun 122 is projected through the lens 129 onto an area of the drum intermediate the areas onto which the two other line patterns are projected.

In the machine illustrated in Fig. 9, the paper 30' is drawn around the drum from a roll 31' onto a roll 32'. Here a screen 65' may be used. In this machine, electrically-charged pigment particles are directed at the drum from three droplet chambers 140, 140' and 140'', which are similar in construction to the droplet chambers 40 already described. These chambers direct differently colored ink particles corresponding to the basic colors of the spectrum, namely, red, green and blue, and may be, respectively, inks of the complementary colors cyan, magenta, and yellow. The image produced on the face of the tube 120 by the electron gun 121 and directed onto the transparent drum 21' by the mirror 125 and lens 126 may be pulled to the surface of the photo-sensitive layer 24' by an electrode 130. As this image passes under the droplet chamber 140, the colored droplets, say cyan-colored droplets, directed from that chamber through the screen 65' are deposited on the paper 30' or repelled therefrom in accordance with this image. This image is then erased from photo-conductive layer 24' by light rays transmitted through the drum to the grounded electrode 132 from a light projector 131. The grounded electrode is coated with a layer of radioactive material to discharge the electric charge on the inked paper.

The image produced on the face of the cathode-ray tube 120 by the electron gun 122 and projected on the drum by the lens 129 is pulled to the surface of the photo-conductive coating 24' by an electrode 130'. As the paper 30' moves under the chamber 140', the droplets, say magenta-colored droplets, projected from that chamber through the screen 65' are deposited on the paper or repelled therefrom in accordance with the photo-conductive image produced on surface 24' by electron gun 122. This image is subsequently erased from the drum by light projected through the drum from a light source 131' and the grounded radioactive electrode 132' which is in registry with said light source and which is angularly displaced around the drum from said chamber 140'.

The image produced on the face of the tube 120 by the electron gun 123 and projected onto the drum by the mirror 127 and lens 128 is pulled to the surface of the drum by the electrode 130'', which is further displaced angularly around the drum from electrode 132'. When this image passes under the paper 30' and under the chamber 140'', which is displaced angularly around the drum from electrode 130'', the, say yellow, ink particles projected from the chamber 140'' through the screen 65' are deposited on or repelled from the paper 30' in accordance with that image. This image is erased from the drum by light rays projected from a light source 131'' onto an aligned grounded radioactive electrode 132'' which is displaced angularly around the drum from chamber 140''.

Thus, as the drum revolves, and the paper is carried around the drum, successive registering colored reproductions of the several images produced by the electron guns 121, 122, and 123 on the surface of the tube 120 are made on the paper 30'. Time delays 135 and 136 in the lines 137 and 138, which lead from the scanner, delay the color signals to the electron guns 122 and 123, as compared to the signal received by electron gun 121 through line 139 of the scanner, until the drum has rotated the distance necessary for perfect registry of all three colors.

The screen 65' is carried around the electrodes 132, 130', 132' and 130'' by rollers 145 and 145'. Other rollers 146 serve to keep the screen taut in the areas in which it passes under the chambers 140, 140' and 140" and must be held close to paper 30'. As before, the screen may be an endless screen and may be carried through a chamber 96 to be cleaned and dried.

Instead of erasing the electrostatic images from the coating 24' at the intervals shown by grounded radioactive plates 132, 132', 132", duct systems, in which ionized air is made to flow, may be used for this purpose.

As in the first case described, again in the case of the machine shown in Fig. 9 a complete image rather than a line image can be projected on the drum. It is merely necessary to stop the drum for the instant that each of the color exposures is made.

If a screen is not used, the structure can be simplified as shown in Fig. 10. Here the paper 30" is wrapped almost around the whole of the drum, moving from the supply roll 31" to the takeup roll 32". The droplet chambers 140, 140', 140" can be enlarged, also. As before, the several images projected through the drum onto the photo-conductive surface 24' under control of the three color signals are pulled to the surface of the drum by the electrodes 130, 130' and 130", respectively, while the images are erased from the surface of the drum prior to each color depositing operation by the discharging (radioactive) electrodes 132, 132' and 132".

The marking particles may as already stated be electrically driven toward the recording sheet. The particles may also be directed at the recording sheet by gravity, or by momentum. If the particles are not too small their momentum will be sufficient to bring them to the vicinity of the screen and the drum.

While it is desirable to have the recording medium placed, as described, over the drum so that deposition of the marking particles may take place directly on said recording medium, it is obvious that deposition can be made to take place directly on the drum and the inked image can be transferred later to a recording medium.

The photo-sensitive surface 24 or 24' may be made in different ways as disclosed in my application Serial No. 173,987 above mentioned. The term "photo-electric matrix" as used hereinafter in the claims is intended to include not only the photosensitive layer but also the drum or other carrying medium, whether opaque or transparent. Furthermore it includes the photosensitive layer whether coated on the outside surface or the back of, or embedded in the drum or other carrying medium. The term "photo-electric," when used in the description or claims of this application, is intended to mean either photoconductive or photoemissive.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Apparatus for pictorial reproduction of an original comprising a photo-electric matrix, means for forming on said matrix an electrical image of the original, different areas of which have different potentials in accordance with differences in tonal values of corresponding areas of the original, and means for directing electrically-charged marking particles toward said matrix to carry the particles into the field of electrical charge of the matrix comprising a chamber which is open at one end and has a plurality of parallel plates mounted therein, alternate pairs of adjacent side walls of said plates forming, respectively, ducts for conducting streams of the marking particles in a gas to said open end of the chamber and ducts for conducting the gas away from said open end, an insulating plate seperating one group of said plates from another, the plates at opposite sides of said insulating plate being put at different potentials.

2. Apparatus for pictorial reproduction of an original comprising a member having an electrically charged image surface different areas of which have different potentials, a foraminous, electrically-conductive potential member disposed in operative relation to said image surface and close enough thereto to electrically isolate charged areas on said surface from one another so that the electrical field lines emanating outwardly from the various charged areas on said surface will tend to flow to the foraminous potential member rather than to other neighboring areas on said image surface, means for directing previously charged marking particles through said potential member toward said surface, means for effecting movement of one of said members relative to the other during operation of said directing means, and separate means for positively causing said marking particles to travel tangential of and at substantially the same velocity as said surface.

3. Apparatus for pictorial reproduction of an original comprising a movable member, means for forming a photoelectric image on a surface of said movable member different areas of which have different potentials, an electrically-conductive perforated grid member, means for moving said grid member relative to said movable member in a direction tangential of said movable member at a different linear velocity from said movable member, means for directing previously electrically-charged marking particles through the perforations of said grid member toward said surface, said grid member being positioned in operative relation to said movable member to produce particle-controlling electric fields between said members, and separate means for positively causing said marking particles to travel with the movable member at substantially the same velocity as said surface.

4. In apparatus of the character described, a movable photo-electric matrix, means for forming on said matrix an electrical charge pattern, different areas of which have different potentials, means for moving said matrix linearly, a movable, foraminous, electrically-conductive potential member, means for moving said potential member, and means for directing a stream of previously electrically-charged marking particles through the apertures in said potential member into the field of the electrical charge of said matrix so that the marking particles are travelling at substantially the same linear speed as said matrix, said potential member being positioned in operative relation to said matrix and close enough thereto to electrically isolate different areas on said matrix from one another so that the electrical field lines emanating outwardly from the various charged areas on said matrix will tend to flow to the foraminous potential member rather than to neighboring areas on said matrix.

5. In apparatus of the character described, a movable photo-electric matrix, means for forming on said matrix an electrical charge pattern, means for moving said matrix linearly, a foraminous, electrically-conductive potential member positioned in operative relation to said matrix and close enough thereto to electrically isolate charged areas on said matrix from one another so that the electrical field lines emanating outwardly from the various charged areas of said matrix will tend to flow to the foraminous potential member rather than to other neighboring areas on said matrix, means for directing a stream of previously electrically-charged marking particles through the apertures in said potential member, and means for positively introducing and positively moving a blanket of a. between said potential member and said matrix at approximately the same linear velocity as said matrix and through which the marking particles must pass to reach the matrix.

6. In apparatus of the character described, a movable photo-electric matrix, means for forming on said matrix an electrical charge pattern, means for moving said matrix linearly, a foraminous, electrically-conductive potential member positioned in operative relation to said matrix and close enough thereto to electrically isolate charged areas on said matrix from one another so that the electrical field lines emanating outwardly from the various charged areas on said matrix will tend to flow to said foraminous potential member rather than to neighboring areas on said matrix, means for moving said potential member over said matrix at a linear velocity different from the linear velocity of said matrix, and means for directing a stream of previously electrically-charged marking particles through the apertures in said potential member at said matrix and into the field of the electric charge of said matrix.

7. In apparatus of the character described, a movable photo-electric matrix, means for forming on said matrix an electrical charge pattern, different areas of which have different potentials, means for moving said matrix linearly, an electrically-conductive, perforated grid member positioned in operative relation to said matrix to have a portion parallel and close enough thereto to electrically isolate charged areas on said matrix from one another so that the electrical field lines emanating outwardly from the various charged areas on said matrix will tend to flow to said perforated grid member rather than to neighboring areas on said matrix, means for moving said matrix linearly, means for moving said grid member relative to said matrix at a linear velocity different from the linear velocity of said matrix, means for directing a stream of previously electrically-charged marking particles through the perforations of said grid member into the field of the electrical charge of said matrix, and means for introducing and moving a blanket of air between said directing means and said grid member at approximately the same linear velocity as said grid member and through which the marking particles must pass to reach said matrix.

8. Apparatus for pictorial reproduction of an original comprising a photo-electric matrix in the form of a rotary drum, means for forming on said matrix an electrical image of the original, different areas of which have different potentials in accordance with differences in tonal values of corresponding areas of the original, means for rotating the drum, means for wrapping and feeding a recording sheet around a portion of said drum, an endless, perforated, electrically-conductive grid member, means for moving said grid member at a different linear velocity from said drum over a part of the portion of the drum over which the recording sheet passes in parallelism to said part and in operative relation to said drum to electrically isolate charged areas on said part of the drum from one another, and means for directing a stream of electrically-charged marking particles through perforations in said grid member into the field of the electrical charge of said matrix.

9. Apparatus for pictorial reproduction of an original comprising a photo-electric matrix in the form of a rotary drum, means for forming on said matrix an electrical image of the original, different areas of which have different potentials in accordance with differences in tonal values of corresponding areas of the original, means for rotating the drum, means for wrapping and feeding a recording sheet around a portion of said drum, an endless, perforated, electrically-conductive grid member, means for moving said grid member at a different linear velocity from said drum over a part of the portion of the drum over which the recording sheet passes in parallelism to said part and in operative relation to said drum to electrically isolate charged areas on said part of the drum from one another, and means for directing a stream of electrically-charged marking particles through perforations in said grid member into the field of the electrical charge of said matrix, and means for introducing and moving a blanket of air between the directing means and the grid member at approximately the same linear velocity as the grid member and through which the marking particles must pass to reach the drum.

10. Apparatus of the character described comprising a photo-electric matrix in the form of a rotary drum, means for directing at said matrix a light beam to form on said matrix an electrical charge pattern, different areas of which have different potentials, means for rotating said drum, a perforated, electrically-conductive grid member disposed around a portion of said drum in operative relation to and close enough to said portion to electrically isolate charged areas of said drum from one another as they rotate under said grid member so that the electrical field lines emanating outwardly from the various charged areas on said matrix will tend to flow to said grid member rather than to neighboring areas on said matrix, means for directing a stream of previously electrically-charged marking particles through said grid member into the field of the electrical charge of said drum as said drum rotates under said grid member, and means disposed at a different position around said drum from said grid member to erase continuously the charge pattern from said drum as it rotates thereunder after the drum has rotated under the grid member and before said drum again rotates into registry with said light-beam directing means.

11. Apparatus for pictorial reproduction of a colored original comprising a photo-electric matrix in the form of a transparent drum, means mounted inside said drum for directing onto angularly-spaced areas of said matrix different electric color images of the original, a plurality of means spaced angularly around the outside of said drum for pulling said images to the surface of said matrix, means for rotating said drum, a plurality of directing means spaced angularly around the outside of said drum for directing, respectively, differently-colored, previously electrically-charged marking particles into the fields of electrical charges of said different images, an electrically-conductive potential member interposed between each of said directing means and said drum and close enough to said drum to produce particle-controlling electric fields between said drum and said potential member, and erasing means interposed between successive directing means angularly around said drum for erasing from said matrix an image previously formed thereon after said image has passed under one directing means and before said image reaches, in the rotation of the drum, the next directing means on the area in which the next image is formed on the drum.

12. Apparatus of the character described comprising a rotary photo-electric matrix, means for forming on said matrix an electrical charge pattern, different areas of which have different potentials, means for rotating said matrix, and a foraminous, electrically-conductive potential member disposed in operative relation to said matrix and close enough thereto to electrically isolate charged areas of said drum from one another as said matrix rotates relative to said potential member so that the electrical field lines emanating outwardly from the various charged areas on said matrix will tend to flow to said potential member rather than to neighboring areas on said matrix, said potential member having ducts for directing, at the opposed face of said matrix and at an angle inclined to a normal to said opposed face, electrically-charged marking particles into the field of electrical charge of said matrix as said matrix rotates relative to said potential member.

13. Apparatus of the character described comprising a photo-electric matrix in the form of a rotary drum, means for forming on said matrix an electrical charge pattern, different areas of which have different potentials, and means for directing electrically-charged marking particles into the field of electrical charge of said matrix, comprising an electrical potential member having a chamber which is open at one end adjacent to the surface of said drum and which has a plurality of plates mounted therein whose end surfaces at one end form the end surface of said potential member, adjacent plates forming ducts through which electrically-charged marking particles may be directed toward said drum, the surface enveloped by the ends of said plates, which are adjacent said drum, being curved to conform to the curvature of the opposed face of said drum, said potential member being disposed in operative relation to said drum and close enough thereto to electrically isolate charged areas on said matrix from one another so that the electrical field lines emanating outwardly from the various charged areas on said matrix will tend to flow to the potential member rather than to other neighboring areas on said matrix.

14. Apparatus of the character described comprising a rotary drum, means for forming on said drum an electrical charge pattern, different areas of which have different potentials, means for rotating said drum, an electrically-conductive, perforated grid member, means for moving said grid member around a portion of said drum at a different velocity from said drum, and means for directing electrically-charged marking particles through said grid member into the electrical field of the charged areas of said drum, said grid member being positioned in operative relation to said portion of said drum and close enough thereto to electrically isolate charged areas on said drum from one another so that the electrical field lines emanating outwardly from the various charged areas on said drum will tend to flow to the grid member rather than to neighboring areas on said drum.

15. Apparatus for pictorial reproduction of an original comprising a photoelectric matrix, means for forming on said matrix an electrical image of the original, different areas of which have different potentials in accordance with differences in tonal values of corresponding areas of the original, a perforated grid member, and directing means for directing electrically charged marking particles through the perforations in said grid member into the field of electrical charge of said matrix comprising a plurality of ducts which have sides that are made of electrically conducting material, the sides of different ducts being at different electrical potentials, and said grid member being disposed in operative relation to said matrix and close enough thereto to electrically isolate different charged areas of said matrix from one another so that the electrical field lines emanating outwardly from the different charged areas will tend to flow to the grid member rather than to other neighboring areas on said matrix.

References Cited in the file of this patent

UNITED STATES PATENTS

| | | |
|---|---|---|
| 1,818,760 | Selenyi | Aug. 11, 1931 |
| 2,173,032 | Wintermute | Sept. 12, 1939 |
| 2,191,827 | Benner et al. | Feb. 27, 1940 |
| 2,221,776 | Carlson | Nov. 19, 1940 |
| 2,224,391 | Huebner | Dec. 10, 1940 |
| 2,277,013 | Carlson | Mar. 17, 1942 |
| 2,281,638 | Sukumlyn | May 5, 1942 |
| 2,297,691 | Carlson | Oct. 6, 1942 |
| 2,357,809 | Carlson | Sept. 12, 1944 |
| 2,451,288 | Huebner | Oct. 12, 1948 |
| 2,486,877 | Ransburg et al. | Nov. 1, 1949 |
| 2,551,582 | Carlson | May 8, 1951 |
| 2,573,881 | Walkup et al. | Nov. 6, 1951 |
| 2,633,796 | Pethick | Apr. 7, 1953 |

FOREIGN PATENTS

| | | |
|---|---|---|
| 605,979 | Great Britain | Aug. 4, 1948 |